United States Patent [19]

Kirkwood

[11] Patent Number: 5,566,802
[45] Date of Patent: Oct. 22, 1996

[54] CONTINUOUS SLIP HYDROKINETIC TORQUE CONVERTER CLUTCH INTERFACE WITH CURCUITOUS GROOVE FOR COOLING AND WETTING CLUTCH INTERFACE ZONE

[75] Inventor: Malcolm E. Kirkwood, Livonia, Mich.

[73] Assignee: Borg-Warner Automotive, Inc., Sterling Heights, Mich.

[21] Appl. No.: 503,126

[22] Filed: Jul. 17, 1995

[51] Int. Cl.⁶ .......................... F16H 45/02; F16D 69/00; F16D 13/72
[52] U.S. Cl. ................ 192/3.29; 192/70.12; 192/70.14; 192/107 R; 192/107 M; 192/113.36
[58] Field of Search .................... 192/3.28, 3.29, 192/3.3, 70.12, 70.14, 107 R, 107 M, 113.36

[56] References Cited

U.S. PATENT DOCUMENTS

| | | | |
|---|---|---|---|
| 4,027,755 | 6/1977 | Evans et al. | 192/18 A |
| 4,986,397 | 1/1991 | Vierk | 192/3.3 |
| 5,056,631 | 10/1991 | Macdonald | 192/3.29 |
| 5,101,953 | 4/1992 | Payvar | 192/107 R |
| 5,176,236 | 1/1993 | Ghidorzi et al. | 192/107 R |
| 5,248,016 | 9/1993 | Umezawa | 192/3.28 |
| 5,335,765 | 8/1994 | Takakura et al. | 192/107 R |
| 5,337,867 | 8/1994 | Kirkwood | 192/3.29 |
| 5,501,309 | 3/1996 | Walth et al. | 192/3.29 |

FOREIGN PATENT DOCUMENTS

| | | | |
|---|---|---|---|
| 6-42606 | 2/1994 | Japan | 192/113.36 |

*Primary Examiner*—Richard M. Lorence
*Attorney, Agent, or Firm*—Reising, Ethington, Barnard & Perry; Greg Dziegielewski

[57] ABSTRACT

A continuous slip bypass friction clutch for a hydrokinetic torque converter has annular interfaces that are adapted to engage and transmit torque while rotating in one direction and continuously slipping. One of the interfaces is provided with circuitous grooves that traverse back and forth across essentially the entire width of this interface to channel hydraulic fluid in the torque converter from a high pressure cavity at an outer diameter of the interfaces past the engaged clutch interfaces through flow paths defined thereby to a low pressure cavity at an inner diameter of the interfaces to thereby wet essentially the entire interface area of the clutch and to cool the clutch with a viscous pumping action that augments cooling differential pressure hydraulic fluid flow induced through the flow paths.

19 Claims, 3 Drawing Sheets

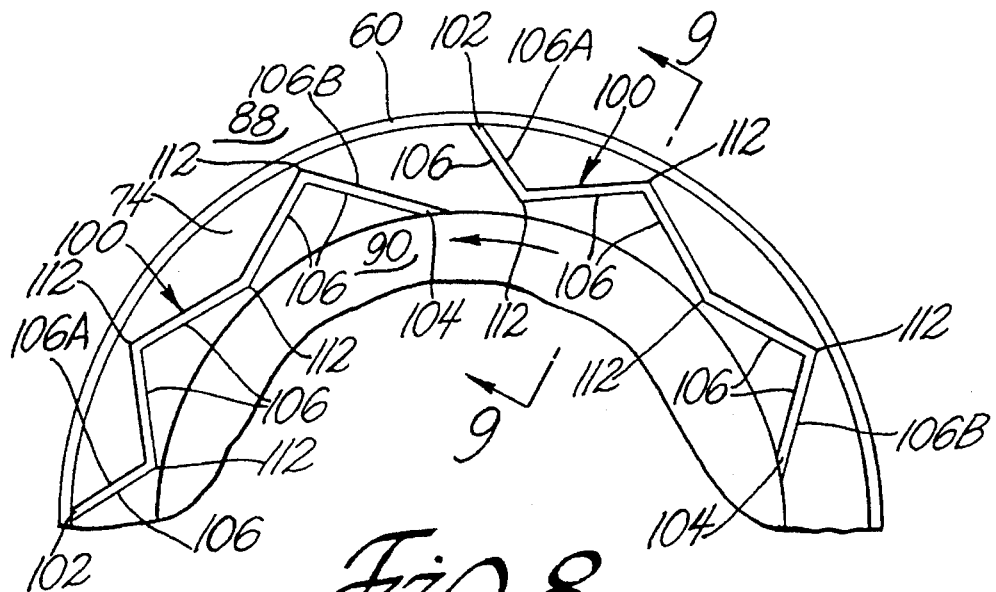
Fig.8
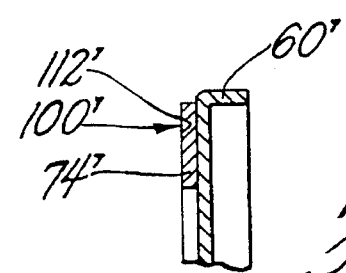
Fig.9
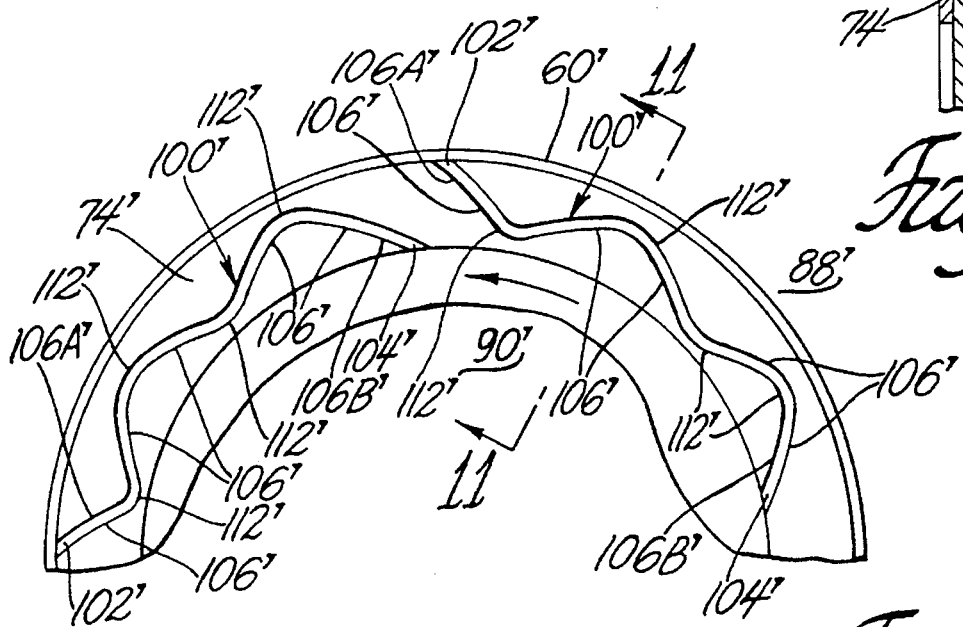
Fig.10
Fig.11

CONTINUOUS SLIP HYDROKINETIC TORQUE CONVERTER CLUTCH INTERFACE WITH CURCUITOUS GROOVE FOR COOLING AND WETTING CLUTCH INTERFACE ZONE

TECHNICAL FIELD

This invention relates to continuous slip bypass friction clutches for hydrokinetic torque converters and more particularly to grooves provided in the input/output elements interface of the clutch for circulating hydraulic fluid across this interface and another clutch interface engaged thereby to cool the interfaces and wet them for efficient slipping engagement.

BACKGROUND OF THE INVENTION

In the continuous slip bypass friction clutches implemented to enhance the operating efficiency of hydrokinetic torque converters, one of the clutch interfaces is normally an annular friction reaction surface and the other is an annular, engineered, paper-based friction facing providing predetermined friction characteristics. The clutch is subjected to a continuously slipping operational mode and without adequate cooling by the operating hydraulic fluid in the converter can generate excessively elevated temperatures leading to catastrophic degradation of both the facing material and the operating hydraulic fluid, the latter being a special oil formulation commonly known as ATF (automatic transmission fluid).

To maintain design intent functional characteristics with time subjected to the above described operational node, two critical phenomenon must be satisfied for best lipping clutch performance. One is the ability to efficiently conduct heat away from the interface zone. The other is the ability to maintain a wetted interface zone avoiding potential areas within the zone of so-called "dry friction" that can produce erratic friction characteristics and excessive or uneven wear and result in a significantly shortened clutch life. Moreover, a hydrokinetic torque converter presents specific restrictions on function that most other forms of wet clutches do not experience. For example, space limitation in the converter usually dictates a very limited number of interface zones of relatively large annular area with the most common typically having only one interface zone and a more advanced compact heat resistant design having three (3) such interface zones as disclosed in my U.S. Pat. No. 5,337,867. In such converters with a continuous slip bypass clutch, the hydraulic circuit within the converter typically includes cavities that surround the outer diameter of the interface zone with high pressure hydraulic fluid and the inner diameter thereof with low or zero pressure hydraulic fluid with this condition existing in concert with total assembly rotational velocity. The differential pressure between these cavities is modulated and utilized to apply the bypass clutch to control the slip speed in the clutch while fluid is circulated through the interface clutch zone(s) from the high pressure cavity to the low pressure cavity to wet and cool the clutch interfaces. However, the volumetric flow of oil through the interface zone(s) is typically restricted to very small values (e.g. not exceeding 1 gpm) because of the restrictions imposed upon the hydraulic supply circuit serving the converter circuit and the slipping bypass clutch limiting the ability to both adequately wet and cool the clutch interfaces. Moreover, it is desired that the bypass clutch is capable of extended operational periods in a low velocity slip mode (e.g. 30–100 rpm relative speed) at high interface energy levels (Watts/$mm^2$) that result in extremely high heat generation in the clutch interface zone(s).

It has been the practice by some to provide a grooveless facing material with a certain porosity for absorbing the hydraulic fluid however this is not a satisfactory solution for avoiding dry friction and is fundamentally lacking in providing for efficient conduction of heat away from the interface zone as there is virtually no oil flow through the interface zone during clutch slip mode. In an attempt to meet both objectives, various forms of groove or channel patterns in the clutch facing material have been proposed such as radial grooves, cross hatch grooves and a combination of annular and radial grooves. Examples of such prior art groove patterns are shown in FIGS. 1–6 of the accompanying drawings. Referring first to FIGS. 1 and 2, there is shown a slipping bypass clutch piston 10 which also serves as a clutch plate and for this purpose has an annular, paper-based facing 12 bonded thereto. The facing 12 is provided with a pattern of radial grooves 14 that open at the outer edge and inner edge of the facing to the aforementioned high pressure cavity and low pressure cavity respectively in the converter to convey hydraulic fluid from the high pressure cavity through the interface zone to the low pressure cavity. Because of flow restrictions, the quantity of radial grooves permissible is limited and, as a result, the ability to effectively influence the control of interface area relative to heat transfer and maintain an adequately wetted interface zone is limited.

Referring next to FIGS. 3 and 4, there is shown a similar bypass clutch piston/clutch plate 16 having a facing 18 provided with a cross hatch pattern of intersecting radial grooves 20 and parallel grooves 22 wherein some of the latter intersect at their opposite ends with the outer diameter of the facing and some extend completely across the facing like the radial grooves but at different angles. And again because of flow restrictions, the quantity of radial grooves and crossing grooves is limited thus limiting the ability to effectively influence the interface area relative to heat transfer and maintain an adequately wetted interface zone. Furthermore, the hydraulic fluid flow in the control circuit for the bypass clutch is normally limited to a low flow rate as mentioned above, and a cross hatch pattern because of its many grooves that traverse the interface zone, lacks the ability to keep the flow through the interface zone under this rate and thus dictates an increased flow for operation of the clutch which is undesirable.

Referring next to FIGS. 5 and 6, there is shown a similar bypass clutch piston/clutch plate 24 having a facing 26 provided with intersecting radial grooves 28 and annular grooves 30 wherein certain of the radial grooves extend from the annular grooves to the outer edge of the facing and certain of the radial grooves extend from the innermost annular groove to the inner edge of the facing. This kind of groove pattern does provide the ability to control flow but the fluid distribution within the interface zone is confined primarily to the annular grooves. And since interface slipping motion is circular, relative large interface areas still risk the potential of dry friction and localized zones of excessive interface temperature. The problem with this type of groove arrangement is in the minimal traversing of interface area in multiple locations in an attempt to maximize the maintenance of wetted interface area throughout the clutch interface zone.

SUMMARY OF THE PRESENT INVENTION

The present invention is in the provision of one or more relatively simple but highly effective circuitous grooves in one of the interfaces of a continuous slip hydrokinetic converter bypass friction clutch wherein the grooves operate to provide both adequate cooling and essentially full wetting of the clutch interfaces and also operate as critical flow limiting orifices between the high and low pressure cavities to control flow. Each of the circuitous grooves traverses back and forth in a plurality of passes across substantially the entire width of the one interface to direct hydraulic fluid in the torque converter from a high pressure cavity at an outer diameter of the interfaces past the engaged clutch interfaces in circuitous traversing flow passes to a low pressure cavity at an inner diameter of the interfaces to thereby wet essentially the entire area of the clutch interfaces and to cool the clutch with a viscous pumping action resulting from the slipping interfaces that augments cooling hydraulic fluid flow induced through the circuitous flow paths by the pressure differential between the high and low pressure cavities. In the case of multiple circuitous grooves, they are thus connected in parallel with each other between the high and low pressure cavities. To assist the viscous pumping action, the circuitous grooves have an inlet section that is angled in the direction of rotation and an outlet section that is angled in the opposite direction and these angles may be varied to either increase or decrease the viscous pumping action. And depending on the application, there may be only one such circuitous groove or a plurality of such grooves angularly spaced about the one interface with the flow area of the grooves, the number of traversing passes of the grooves and the length of the grooves all being variable at the discretion of the designer to establish adequate wetting and cooling in the continuous slip bypass clutch interface zone(s) and satisfy flow restriction imposed by the transmission control circuit.

The circuitous form of groove of the present invention may have straight traversing sections with pointed return bends or a smooth sinusoidal form and provides for a wide flexibility in controlling the hydraulic flow through the clutch interface zone when subjected to the high and low pressures in the high and low pressure cavities at the respective outer and inner edges or diameters of the interfaces. And it will be further appreciated that the circuitous form of groove of the present invention with its multiple traversing passes across essentially the entire width of the interface zone(s) provides the capability of maximizing the percentage of friction surface traversed by the groove pattern for essentially full wetting of the interface zone(s) resulting in a minimum potential for the development of any dry friction. And with dry friction minimized or eliminated, the interface temperatures are reduced dramatically thereby significantly improving the ability to maintain consistent friction characteristics with time and total wear of the friction surfaces and thus significantly extending the useful life of the bypass clutch.

it is therefore an object of the present invention to provide a new and improved hydraulic fluid channeling groove form for the interface of a continuous slip bypass friction clutch in a hydrokinetic torque converter.

Another object is to maximize wetting and effect efficient cooling of the interfaces of a continuous slip bypass friction clutch in a hydrokinetic torque converter with a unique groove pattern in one of the interfaces.

Another object is to provide a continuous slip bypass friction clutch with a clutch facing grooved pattern that promotes maximum wetted friction clutch interface area and functions as a critical flow limiting orifice between high and low pressure cavities within a hydrokinetic torque converter.

Another object is to provide one or more independent circuitous hydraulic fluid channeling grooves in the interface of a continuous slip bypass friction clutch in a hydrokinetic torque converter wherein the groove(s) operates to effect and maintain substantially full wetting of the clutch interfaces, provides a viscous pumping action that augments the cooling flow through the circuitous groove induced by pressure differential, and operates as critical flow limiting orifice.

Another object is to provide one or more traversing circuitous hydraulic fluid channeling grooves in the interface of a continuous slip bypass friction clutch in a hydrokinetic torque converter for directing flow from a high pressure cavity in the converter through a bypass clutch interface zone to a low pressure cavity in the converter wherein the groove(s) repeatedly traverses essentially the entire width of the interface clutch zone, operates to effect and maintain substantially full wetting of the clutch interfaces, provides a viscous pumping action that augments the cooling flow through the circuitous groove induced by pressure differential, and acts as a critical flow limiting orifice to limit the flow through the interface zone between the high and low pressure cavities.

These and other objects, advantages and features of the present invention will become more apparent from the following description and accompanying drawings:

BRIEF DESCRIPTION OF THE DRAWINGS

FIG. 8 is plan view of one of the grooved interfaces of the bypass friction clutch taken along the line 8—8 in FIG. 7 when looking in the direction of the arrows;

FIG. 9 is a view taken along the line 9—9 in FIG. 8 when looking in the direction of the arrows;

FIG. 10 is a view similar to FIG. 9 showing another embodiment of the invention; and FIG. 11 is a view taken along the line 11—11 in FIG. 10.

DETAILED DESCRIPTION OF THE DRAWINGS OF THE INVENTION

Figure 1:
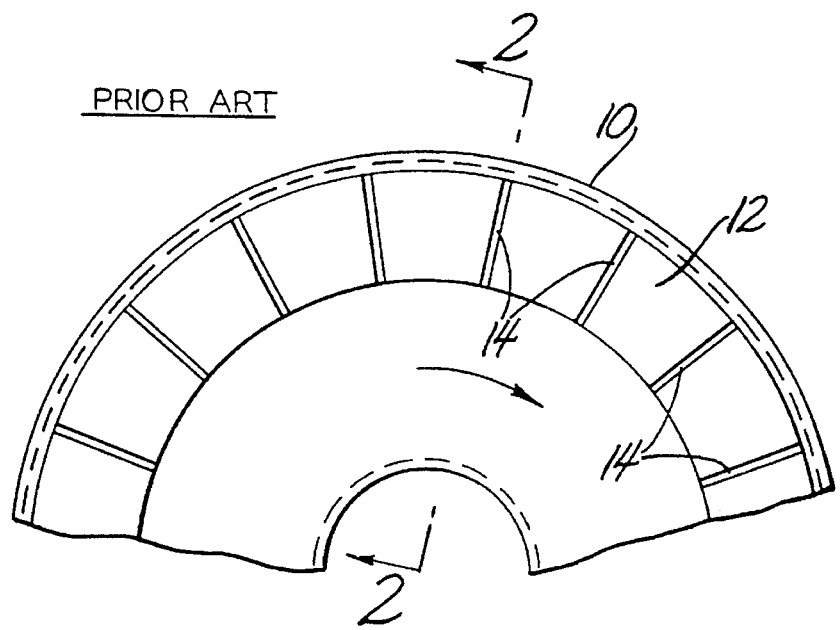
FIG. 1 is a partial plan view of a prior art groove pattern of a continuous slip bypass friction clutch piston/clutch plate.
Figure 2:
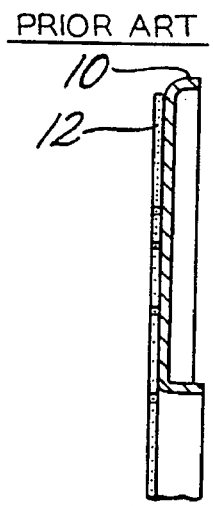
FIG. 2 is a view taken along the line 2—2 in FIG. 1 when looking in the direction of the arrows.
Figure 3:
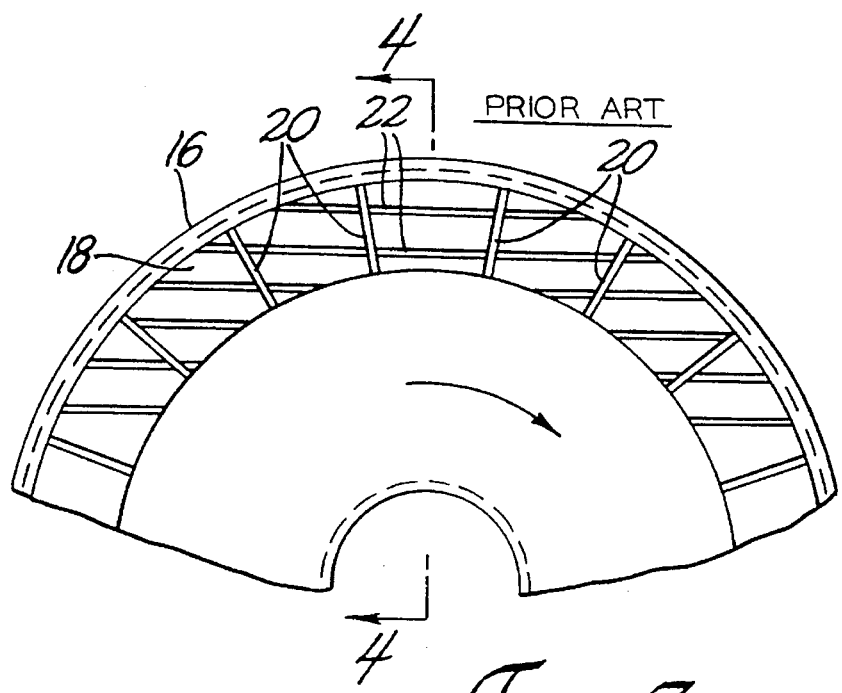
FIG. 3 is a view similar to FIG. 1 showing another prior art groove pattern.
Figure 4:
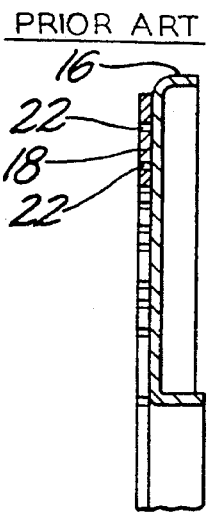
FIG. 4 is a view taken along the line 3—3 in FIG. 3 when looking in the direction of the arrows.
Figure 5:
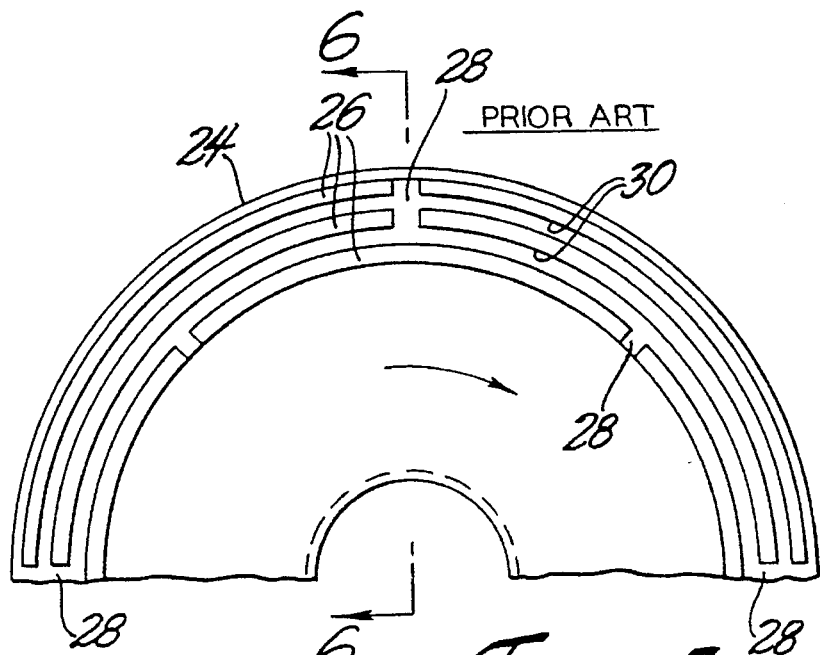
FIG. 5 is a view similar to FIG. 1 showing another prior art groove pattern.
Figure 6:
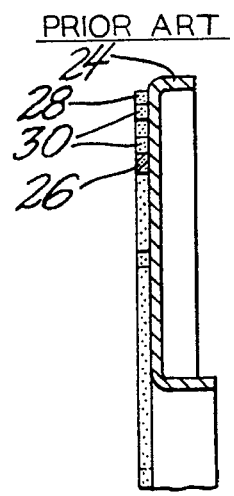
FIG. 6 is a view taken along the line 6—6 in FIG. 5 when looking in the direction of the arrows.
Figure 7:
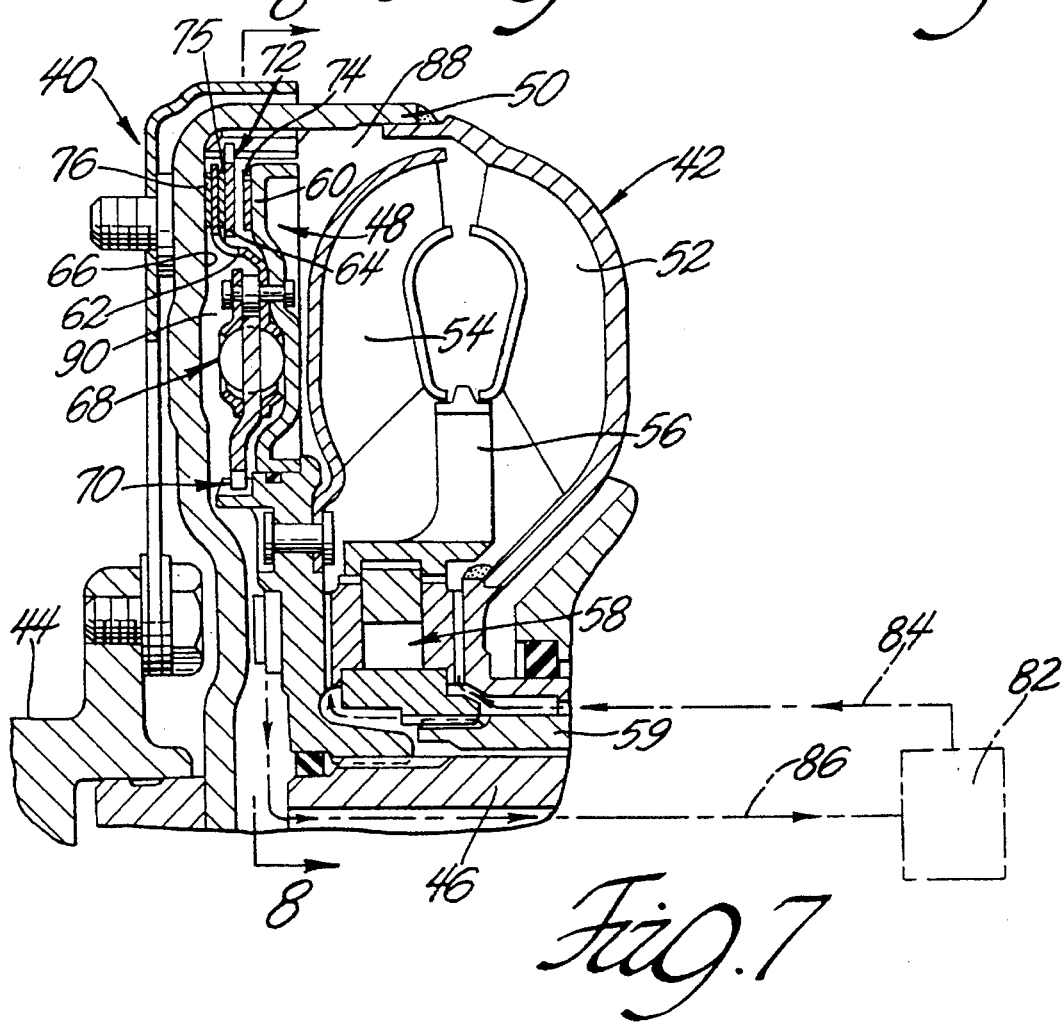
FIG. 7 is a partial longitudinal sectional view of a hydrokinetic torque converter having a continuous slip bypass friction clutch incorporating the present invention.

Referring to FIG. 7, there is shown the front upper section of an automatic transmission 40 having a hydrokinetic torque converter 42 that operatively connects an internal combustion engine crankshaft 44 with the transmission gearing (not shown) via a converter output/gearing input shaft 46. The torque converter includes a continuous slip bypass friction clutch 48 with multiple friction plates that operatively connects the engine crankshaft 44 to the converter output shaft 46 in bypass relationship to the hydraulic torque path in the converter. The transmission is intended for use in a motor vehicle and the torque converter 42 and the bypass friction clutch 48 apart from its interface groove pattern are like that disclosed in the aforementioned U.S. Pat. No. 5,337,867 which is hereby incorporated by reference.

The torque converter 42 generally comprises a cover 50 that is connected to be driven by the engine crankshaft and covers the converter's internals including a pump section 52 that is connected directly to the cover, a turbine section 54 that is connected to the converter output/gearing input shaft 46, and a stator section 56 that is located between the exit of the turbine section and the entrance of the pump section and is mounted by a one-way clutch 58 on a stationary part 59 of the transmission. The bypass friction clutch 48 generally comprises an annular clutch apply piston/clutch plate 60, second and third annular clutch plates 62 and 64, and an annular reaction friction surface 66. The piston/clutch plate 60 and the second clutch plate 62 are connected by a spring damping assembly 68 and a slidable spline connection 70 to the converter output/gearing input shaft 46. The third clutch plate 64 is sandwiched between the two former plates and is coupled by a slidable spline connection 72 to the interior of the cover 50, and the reaction friction surface 66 is provided on the interior of the cover opposite one side of the clutch plate 62. The piston/clutch plate 60 has an annular paper-based facing or interface 74 that is contactable with one side of the clutch plate 64 and the clutch plate 62 has annular paper-based facings or interfaces 75 and 76 on the opposite sides thereof that are contactable with the other side of the clutch plate 64 and the reaction friction surface 66 respectively. The continuous slip bypass clutch 48 is engaged by hydraulic pressure forced leftward movement of the piston/clutch plate 60 as described in more detail later and when provided with a grooved pattern in its interface zones in accordance with the present invention provides very significant damping in the drive path between the engine crankshaft and the converter output/gearing input shaft with the result that the damping assembly 68 may be omitted or only required in harsh vibration situations.

Hydraulic fluid (ATF) is circulated through the converter for operation of the converter pump, turbine and stator and also operation and control of the bypass clutch in a well known manner. In such operation, the converter stator provides torque multiplication that decreases as the turbine speed approaches pump speed and the bypass clutch is engaged by action of the piston/clutch plate to continuously slip at a controlled rate while mechanically transmitting torque in bypass or parallel relationship to the hydraulic path via the converter pump and turbine. For such operation, the converter is supplied with hydraulic fluid by a transmission control system 82 of a suitable conventional type that includes an input driven pump and a cooler and a bypass clutch control valve and is connected with the converter's hydraulic circuit by a supply passage 84 and a return passage 86. The bypass clutch 48 is operated by the pressure differential between a high pressure chamber or cavity 88 at one side of the piston/clutch plate 60 that is open to the hydraulic circuit of the converter pump and turbine fed by the supply passage 84 and a low pressure chamber or cavity 90 at the opposite side of the piston/clutch plate that is connected to the return passage 86. The transmission control system 82 is operable to control or modulate the pressure differential between the passages 84 and 86 and thereby control the clutch slip speed in a well known manner to improve transmission efficiency and minimize the transmissibility characteristics of the system to torsional disturbances generated by the input power source.

The present invention is in the provision of one or more relatively simple but highly effective circuitous grooves 100 in one of the interfaces in each of the interface zones of the continuous slip hydrokinetic converter bypass friction clutch 48 wherein the grooves are separate and independent of each other and operate to provide both adequate cooling and essentially full wetting of the clutch interfaces. The grooves 100 will be described with reference to their inclusion in the friction material forming the clutch interface 74 on the piston/clutch plate 60 as shown in FIGS. 8 and 9 and it will be understood that similar grooves are provided in the friction material forming the clutch interfaces 75 and 76 on the clutch plate 62 and are similarly angled with respect to the direction of converter/bypass clutch rotation.

As seen in FIG. 8, each of the circuitous grooves 100 extends a substantial distance in an annular direction about the interface 74 and has an inlet 102 at one end and an outlet 104 at the opposite end. The inlet 102 is open to the high pressure cavity 88 at the outer diameter of the interface 74 and the outlet 104 is angularly remote from the inlet and is open at the inner diameter of his interface to the low pressure cavity 90. Each groove 100 traverses back and forth between its inlet and outlet in at least three (3) or more passes 106 across substantially the entire width of this facing and thus its interface zone to direct hydraulic fluid in the torque converter from the high pressure cavity past the engaged clutch interfaces (i.e. through their interface zone) in circuitous traversing flow passes to the low pressure cavity to provide (a) wetting of essentially the entire area of the clutch interfaces, (b) cooling of the clutch with a viscous pumping action that augments cooling hydraulic fluid flow induced through the circuitous flow path by the pressure differential between the high and low pressure cavities, and (c) flow limiting action wherein the groove functions as a critical flow limiting orifice between the high and low pressure cavities within the torque converter.

To assist the viscous pumping action by the slipping movement of the interfaces, the circuitous grooves 100 have a traversing inlet section 106A that forms one of the traversing passes 106 (i.e. the entry pass) and is angled generally opposite the direction of converter/bypass clutch rotation indicated by the arrow in FIG. 8 and a traversing outlet section 106B that also forms one of the traversing passes 106 (i.e. the exit pass) and is angled generally in the direction of rotation and these angles may be varied to either increase or decrease the pumping action caused by their leading and trailing directions apart from the flow induced in the groove by the pressure differential between the high and low pressure cavities 88 and 90. And depending on the application, there may be only one such circuitous groove or a plurality of such grooves that form the groove pattern and are angularly spaced about the one interface with the flow area of the grooves, the number of traversing passes of the grooves and the length of the grooves all being variable at the discretion of the designer to appropriately control the hydraulic flow and establish adequate wetting and cooling of the interface zone. For example, in the embodiment in FIG. 8, appropriate flow control for a converter with a continuous slip bypass clutch with three (3) interface zones as in the continuous slip bypass clutch 48 in FIG. 7 and a maximum flow rate through the converter of about one (1) gpm is provided with four (4) such grooves 100 (only two being shown) that are equally angularly spaced in quadrants about the interface with the grooves all being identical and having a uniform cross section or flow area along their length of rectangular shape measuring about 0.100 inches wide and 0.030–0.040 inches deep and traversing the interface zone five (5) times or in five passes. It will be further appreciated that in the case of multiple grooves 100 as shown, they are connected in parallel with each other between the high and low pressure cavities 88 and 90 nor are they intersected by any other form of groove and thus operate independently in providing the wetting, cooling and flow limiting action with uninterrupted but limited flow through each groove. Where there are less interface zones, (e.g. only one) the number of circuitous grooves may be increased and/or the flow area of the grooves may be increased to maintain the desired flow control by the grooves. Alternatively, where there are more interface zones, the number of circuitous grooves may be decreased and/or the flow area of the grooves may be decreased to maintain the desired flow control by the grooves. It will also be understood that there may be only one such circuitous groove in the interface zone that extends substantially completely there around and has a very large number of traversing passes (e.g. 20 passes) between its inlet and outlet and wherein the groove flow area is determined to provide the desired flow control by this singular groove. Alternatively, the grooves 100 can be molded to have a uniform cross-section of generaly V-shape as shown at 100' in FIG. 11.

The circuitous form of groove of the present invention may have straight angled traversing sections or passes 106 with sharp or pointed apexes or return bends 112 along its length as shown by the groove embodiment 100 in FIGS. 8 and 9 or may have a smoothly curved wave form or shape along its length as shown by the groove embodiment in FIGS. 10 and 11 wherein the same numbers only primed are used to identify parts similar to those in FIGS. 7–9. Referring to FIGS. 10 and 11, the grooves 100' in the interface 74' are of sinusoidal form or shape along their length and have the same number of traversing passes as the grooves 100 but with smoothly curved traversing sections or passes 106' and return bends 112' and provide essentially the same wetting, cooling and flow limiting action with rearwardly angled (angled generally opposite to the direction of rotation) curved inlet section or pass 106A' that is open at the groove inlet 102' to the high pressure cavity 88' and a forwardly angled (angled generally in the direction of rotation) curved outlet section or pass 106B' that is open at the groove outlet 104' to the low pressure cavity 90'.

The multifunction wetting/cooling/flow limiting grooves of the present invention provide for a wide flexibility in controlling the hydraulic flow through the clutch interface zone when subjected to the relatively high and low pressures in the high and low pressure cavities at the respective outer and inner edges or diameters of the interfaces wherein in the control of the bypass clutch the differential pressure between these cavities may vary for example from a high of about 120 psi to a low of about 20 psi to control the clutch slip speed. In addition, the circuitous form of groove of the present invention wherein each of the one or more grooves intermediate its inlet and outlet extends transversely along its length back and forth in at least three (3) or more passes across essentially the full width of the facing and wherein the inlet and outlet passes of the groove sweep the area of the interface zone that is not swept by the intermediate passes provides the capability of maximizing the percentage of friction surface traversed by the groove pattern resulting in a minimum potential for the development of dry friction anywhere in the interface zone. And with dry friction minimized or eliminated, the interface temperatures are reduced dramatically thereby significantly improving the ability to maintain consistent friction characteristics with time and total wear of the friction surfaces and resulting in a significantly extend clutch life.

Moreover, the grooves are readily manufacturable in a cost effective manner in that they may be stamped out in the paper-based facings together with the overall shape of the facings prior to their bonding to the clutch plates. For example, low cost rule-dies or punch and die sets may be used to stamp out the grooved facings from flat paper-based friction material stock at very high production rates whether the desired groove form is a straight sectioned groove form or a sinusoidal groove form or some other suitable groove wave form.

The invention has been described in an illustrative manner with respect to presently preferred embodiments, and it is to be understood that the terminology that has been used is intended to be in the nature of words of description rather than words of limitation. Obviously, many modifications and variations of the present invention in light of the above teachings may be made. For example, the grooves are preferably formed in the friction facings but it will also be understood that they may be formed directly in a metal clutch plate in which case they would not extend through the plate as slots and instead have a certain depth as described above. It is therefore to be understood that within the scope of the appended claims, the invention may be practiced otherwise than as specifically shown and described.

What is claimed is:

1. A continuous slip bypass friction clutch for a hydrokinetic torque converter, said clutch having at least one pair of annular interfaces that are adapted to engage while rotating in one direction and continuously slipping relative to each other to effect torque transmission in bypass relationship to torque transmitted by hydraulic fluid in said converter, one of said interfaces having a prescribed width and at least one circuitous groove, said groove extending a substantial annular distance about said one interface and adapted to direct hydraulic fluid in said torque converter from a high pressure cavity at an outer edge of said one interface and across the width of said one interface in a circuitous path in at least three traversing passes to a low pressure cavity at an inner edge of said one interface, each of said passes extending substantially the entire width of said one interface, said groove having an inlet section that defines one of said passes and has an inlet that is adapted to open said groove at said outer edge of said one interface to said high pressure cavity, and said groove having an outlet section that defines another of said passes and has an outlet that is adapted to open said groove at said inner edge of said one interface to said low pressure cavity at an angular location remote from said inlet.

2. A continuous slip bypass friction clutch as defined in claim 1 wherein said inlet section is angled generally opposite to said one direction, and said outlet section is angled generally in the direction of said one direction.

3. A continuous slip bypass friction clutch as defined in claim 1 wherein a paper-based friction material forms said one interface, and said groove is formed in and extends through said friction material.

4. A continuous slip bypass friction clutch as defined in claim 1 wherein there are a plurality of said grooves angularly spaced about said one interface and connected in parallel with each other between said high and low pressure cavities.

5. A continuous slip bypass friction clutch as defined in claim 1 wherein said groove has a rectangular cross section flow area with a relatively small depth and a relatively large width.

6. A continuous slip bypass friction clutch as defined in claim 1 wherein said groove has a smooth sinusoidal shape with apexes located closely adjacent the edges that the apexes are nearest to.

7. A continuous slip bypass friction clutch as defined in claim 1 wherein said groove has straight traversing sections and pointed return bends joining said straight traversing sections, and said return bends are located closely adjacent the edges that the return bends are nearest to.

8. A continuous slip bypass friction clutch as defined in claim 1 wherein said groove has a uniform cross sectional flow area.

9. A continuous slip bypass friction clutch as defined in claim 1 wherein there are four of said grooves equally angularly spaced about said one interface and there are five of said passes.

10. An annular friction clutch facing for a hydrokinetic torque converter continuous slip bypass clutch, said facing having a prescribed width and at least one circuitous groove extending a substantial annular distance about said facing adapted to direct hydraulic fluid in a hydrokinetic torque converter from a high pressure cavity at an outer edge of said facing and across the width of said facing in a circuitous path in at least three traversing passes to a low pressure cavity at an inner edge of said facing, each of said passes extending substantially the entire width of said facing, said groove having an inlet section that defines one of said passes and has an inlet that is adapted to open said groove at said outer edge of said facing to said high pressure cavity, and said groove having an outlet section that defines another of said passes and has an outlet that is adapted to open said groove at said inner edge of said facing to said low pressure cavity at an angular location remote from said inlet.

11. A clutch facing as defined in claim 10 wherein said inlet section is angled generally in the direction of rotation of said facing, and said outlet section is angled generally in a direction opposite the direction of rotation of said facing.

12. A clutch facing as defined in claim 10 wherein said facing is formed of a paper-based friction material, and said groove is formed in and extends through said friction material.

13. A clutch facing as defined in claim 10 wherein there are a plurality of said grooves angularly spaced about said facing and connected in parallel with each other between said high and low pressure cavities.

14. A clutch facing as defined in claim 10 wherein said groove has a rectangular cross sectional flow area with a relatively small depth and a relatively large width.

15. A clutch facing as defined in claim 10 wherein said groove has a smooth sinusoidal shape with apexes located closely adjacent the edges that the apexes are nearest to.

16. A clutch facing as defined in claim 10 wherein said groove has straight traversing sections and pointed return bends joining said straight traversing sections, and said return bends are located closely adjacent the edges that the return bends are nearest to.

17. A clutch facing as defined in claim 10 wherein said groove has a uniform cross sectional flow area.

18. A clutch facing as defined in claim 10 wherein there are four of said grooves equally angularly spaced about said facing and there are five of said passes.

19. A clutch facing as defined in claim 10 wherein said groove is an uninterrupted groove.

* * * * *